United States Patent
Kim

(10) Patent No.: US 9,122,304 B2
(45) Date of Patent: Sep. 1, 2015

(54) METHOD AND APPARATUS FOR PROVIDING FUNCTION OF PORTABLE TERMINAL USING COLOR SENSOR

(75) Inventor: Hyun Kyung Kim, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 878 days.

(21) Appl. No.: 13/039,821

(22) Filed: Mar. 3, 2011

(65) Prior Publication Data

US 2011/0215997 A1 Sep. 8, 2011

(30) Foreign Application Priority Data

Mar. 3, 2010 (KR) .................. 10-2010-0019040

(51) Int. Cl.
*G06F 3/00* (2006.01)

(52) U.S. Cl.
CPC ...................... *G06F 3/002* (2013.01)

(58) Field of Classification Search
USPC ....................................... 382/100
See application file for complete search history.

(56) References Cited

U.S. PATENT DOCUMENTS

| 2006/0125819 A1* | 6/2006 | Hakansson ................. 345/418 |
| 2011/0063433 A1* | 3/2011 | Thonhauser ................ 348/135 |
| 2012/0081695 A1* | 4/2012 | Majumdar et al. .......... 356/72 |

FOREIGN PATENT DOCUMENTS

| CN | 1949144 A | 4/2007 |
| CN | 100382575 C | 4/2008 |
| JP | 2007-274275 A | 10/2007 |

OTHER PUBLICATIONS

Jasc Software, "Paint Shop Pro User Guide", 2003, Jasc Software, p. 90-91.*
Jasc Software, Paint Shop Pro User Guide, http://ec1.images-amazon.com/media/i3d/01/A/man-migrate/MANUAL000014997.pdf, Dec. 31, 2003, pp. 1-438.

* cited by examiner

*Primary Examiner* — Kenneth Bukowski
(74) *Attorney, Agent, or Firm* — Jefferson IP Law, LLP

(57) ABSTRACT

A method for providing a function of a portable terminal is provided. The method includes activating a color sensor upon execution of an application, displaying a color recognized by the color sensor on screen data corresponding to the executed application, and controlling a function based on a color recognized by the executed application.

17 Claims, 7 Drawing Sheets

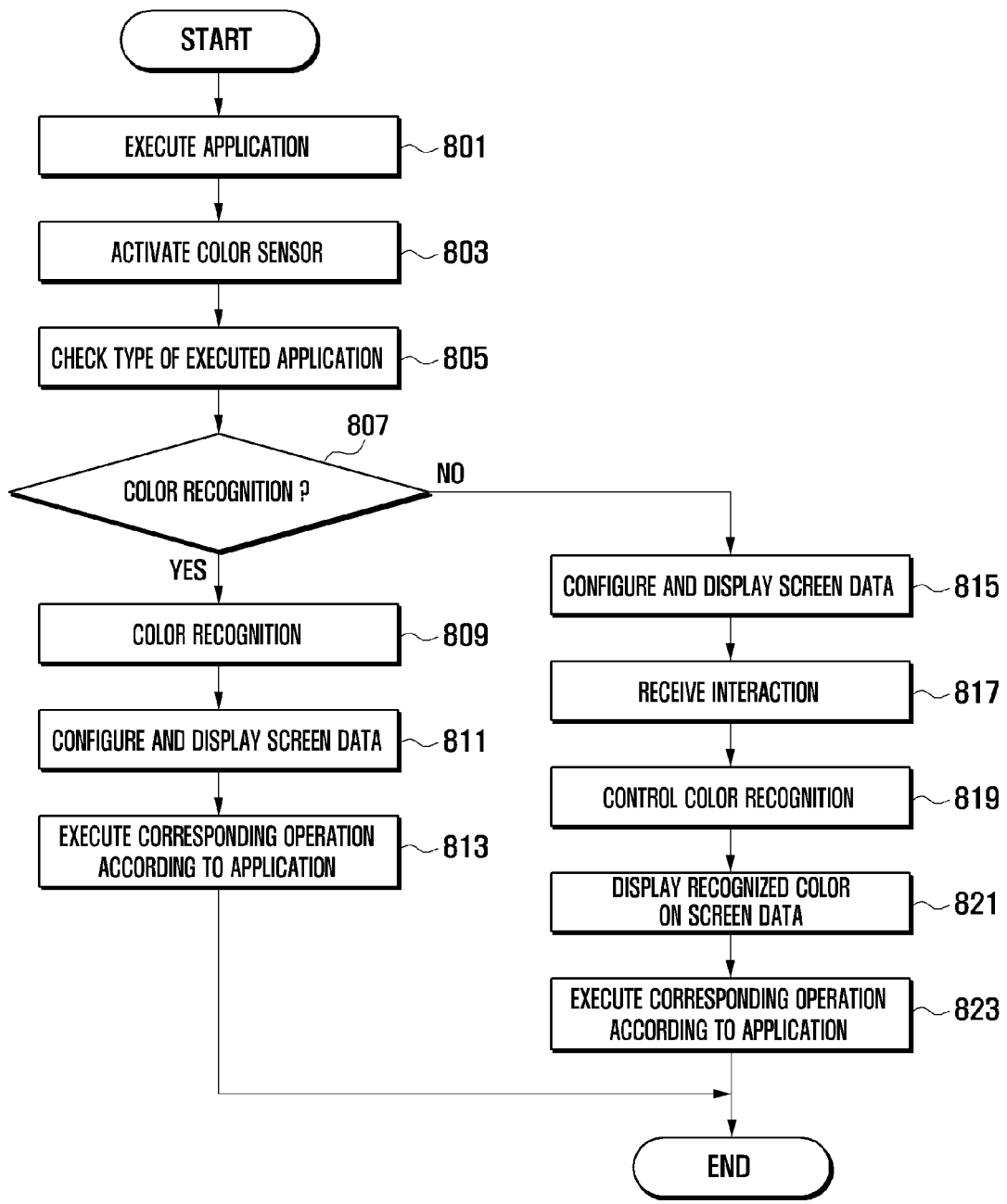

METHOD AND APPARATUS FOR PROVIDING FUNCTION OF PORTABLE TERMINAL USING COLOR SENSOR

PRIORITY

This application claims the benefit under 35 U.S.C. §119 (a) of a Korean patent application filed on Mar. 3, 2010 in the Korean Intellectual Property Office and assigned Serial No. 10-2010-0019040, the entire disclosure of which is hereby incorporated by reference.

BACKGROUND OF THE INVENTION

1. Field of the Invention

The present invention relates to a method and an apparatus for providing a function of a portable terminal. More particularly, the present invention relates to a method and an apparatus for providing a function of a portable terminal that may extend a function supported from the portable terminal and provide a new color recognition based service based on the extended function therein using a color sensor.

2. Description of the Related Art

In recent years, with significant development of information and communication and semiconductor technologies, the use of all types of portable terminals has rapidly increased. A representative mobile communication terminal provides various functions, including a TV function (mobile broadcast such as Digital Multimedia Broadcasting (DMB)) or Digital Video Broadcasting (DVB), a music play function (e.g., MPEG Audio Layer-3 (MP3)), a photographing function, and an Internet access function as well as general communication functions such as voice call and message transmission and reception.

SUMMARY OF THE INVENTION

An aspect of the present invention is to address the above-mentioned problems and/or disadvantages and to provide at least the advantages described below. Accordingly, an aspect of the present invention is to provide a new specific function using a color sensor in a portable terminal.

Another aspect of the present invention is to provide a portable terminal with a color sensor capable of implementing a new function using a color sensor, and a control method thereof.

Another aspect of the present invention is to support a user interface suitable according to an executed application when an application is executed using a color sensor in a portable terminal using it, and to realize an environment capable of providing a new function using a color sensor based on the supported user interface.

In accordance with an aspect of the present invention, a method for providing a function of a portable terminal is provided. The method includes, activating a color sensor upon execution of an application, displaying a color recognized by the color sensor on screen data corresponding to the executed application, and controlling a function based on the color recognized by the executed application.

In accordance with another aspect of the present invention, a portable terminal is provided. The portable terminal includes, a display unit for displaying screen data corresponding to an executed application, a color sensor for detecting a color, and a controller for displaying a color recognized by the color sensor on screen data corresponding to an executed application when an application is executed, and for controlling execution of a function based on the color recognized in the executed application.

In accordance with another aspect of the present invention, a method of providing a color recognition function in a portable terminal is provided. The method includes executing an application stored in the portable terminal, activating a color sensor of the portable terminal, displaying, on the portable terminal, screen data based on at least one of a color recognized by the color sensor, a function of the executing application, and a user interaction, and controlling an operation of the executing application based on the recognized color.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 8 is a flowchart illustrating a control method of a portable terminal upon execution of an application using a color sensor in the portable terminal according to an exemplary embodiment of the present invention.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present invention relates to a portable terminal including a color sensor capable of recognizing a color and supporting an optimal color learning function using the recognized color, and a control method thereof.

An exemplary embodiment of the present invention may activate a color sensor upon execution of an application using the color sensor. Exemplary embodiments of the present invention may provide various learning functions using a color sensor according to a type of an execution application. For example, an exemplary embodiment of the present invention may provide a color change function of screen data using a color recognized by a color sensor, a function searching peripheral colors corresponding to a color recognized by the color sensor, a color dictionary function providing information regarding a color recognized by the color sensor, a history function recording reaction with respect to a color recognized by a user through a combination of a color recognition function of the color sensor and other additional functions.

Hereinafter, a construction of a portable terminal and an operation control method thereof according to an exemplary embodiment of the present invention will be described with reference to FIG. 1 to FIG. 8. However, a construction of a portable terminal and an operation control method thereof are not limited to the following exemplary embodiments.

Figure 1:
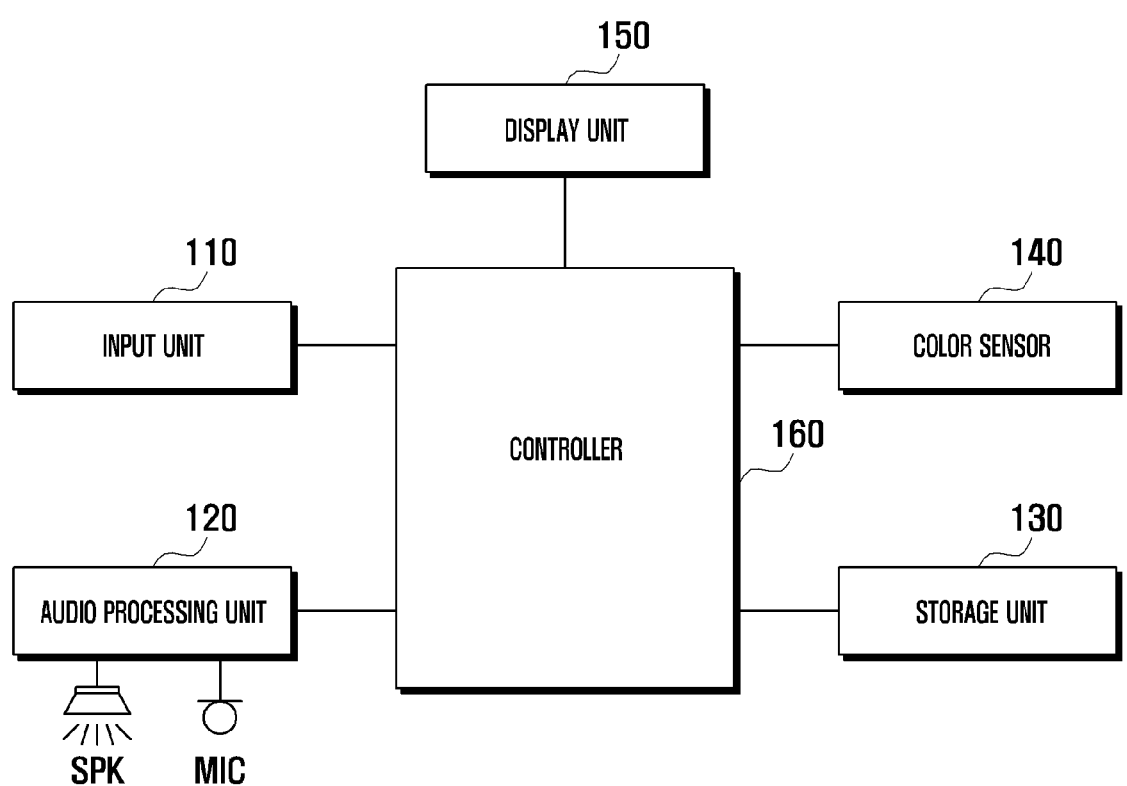
FIG. 1 is a block diagram schematically illustrating a configuration of a portable terminal according to an exemplary embodiment of the present invention.

FIG. 1 is a block diagram schematically illustrating a configuration of a portable terminal according to an exemplary embodiment of the present invention.

Referring to FIG. 1, the portable terminal includes an input unit 110, an audio processing unit 120, a storage unit 130, a color sensor 140, a display unit 150, and a controller 160. The portable terminal may include additional and/or different units not shown for convenience of description. Similarly, the functionality of two or more of the above units may be integrated into a single component. While various units may include functionality implemented as software components, other units would be understood to include hardware components, especially where appropriate functionality of the units could not be implemented in software.

The audio processing unit 120 may include a speaker SPK and a microphone MIC. The portable terminal may include a Radio Frequency (RF) unit, a digital broadcasting module performing reception and reproduction of digital broadcast (e.g., mobile broadcast such as Digital Multimedia Broadcasting (DMB) or Digital Video Broadcasting (DVB)), a camera module for a photographing function, and BLUETOOTH. However, a detailed description and drawings thereof are omitted.

The input unit 110 senses an operation of a user to generate and transfer a corresponding input signal to the controller 160. The input unit 110 may be configured by a plurality of buttons. The input unit 110 may include at least one button generating an input signal according to activation of the color sensor 140 and execution of an application.

The audio processing unit 120 may include a speaker SPK playing an audio signal of the portable terminal and a microphone MIC collecting an audio signal such as user voices. The audio processing unit 120 converts an audio signal received from the microphone MIC and outputs the audio signal to the controller 160. The audio processing unit 120 outputs an audio signal input from the controller 160 using the speaker SPK. The audio processing unit 120 may output various audio signals created in the portable terminal according to selection of a user. The audio signal may include an audio signal created according to the reproduction of video data or audio data, and an audio signal for alarm according to execution of a specific function (e.g., an application using a color sensor) and an operation thereof.

The storage unit 130 may store all types of programs and data executed and processed in the portable terminal, and may be configured by at least one volatile memory device and a non-volatile memory device. For example, the storage unit 130 may store an operating system of the portable terminal, programs and data associated with a control operation of the color sensor 140, programs and data associated with a display control operation of the display unit 150, and application and data using the color sensor 140. The storage unit 130 may store a fundamental color table for comparison and compensation of a recognized color.

The color sensor 140 detects a color being one of signal information, and may include a color filter and a photo diode. The color sensor 140 measures light amount and a color of a periphery to distinguish the three primary colors of light, Red (referred to as 'R' hereinafter), Green (referred to as 'G' hereinafter), Blue (referred to as 'B' hereinafter), using a difference of unique color wavelengths, and outputs an amount thereof to the controller 160 as an analog or digital value. The color sensor 140 may illuminate a target using a light source and detect reflected light using a sensor. The color sensor 140 may recognize a color by output comparison of three colors of RGB from the sensor.

Upon execution of an application, the color sensor 140 may automatically operate or operate by selection of a user. The display unit 150 provides applications supported from the portable terminal. For example, the display unit 150 provides an execution screen such as a message function, an electronic mail function, an Internet function, a multi-media function, a searching function, a communication function, an electronic book reading function (e.g., e-book), a moving image function, a photography function, a photograph viewing function, a TV watching function (e.g., mobile broadcast such as DMB or DVB), music play function (e.g., MP3), or a widget function.

A Liquid Crystal Display (LCD) is generally used as the display unit 150. Other display devices such as an Organic Light Emitting Diode (OLED), or active OLED (AMOLED, Active Matrix OLED) can be used. The display unit 150 may provide a longitudinal mode or a transverse mode upon displaying screen data. The display unit 150 may include a touch input unit (not shown). The display unit may be implemented by a touch screen. The display unit 150 may generate an input signal according to a user interaction by a construction of a touch screen and transfer the input signal to the controller 160. Upon execution of an application using the color sensor 140, the display unit 150 may display screen data thereof and a recognized color. The display unit 150 may visibly display various signals and color information output from the controller 160. The display unit 150 may provide a User Interface (UI) for operating an application using the color sensor 140.

The controller 160 controls an overall operation of the portable terminal. Upon execution of an application using a color sensor 140, the controller 160 controls activation of the color sensor 140. The controller 160 converts color data (e.g., color coordinate data) detected by the color sensor 140 into data (e.g., RGB data) to be recognized by the portable terminal, and transfers the data to a display unit 150. The controller 160 controls a color recognized by the color sensor 140 to be displayed on screen data corresponding to an execution application.

The controller 160 may perform all types of control operations associated with a function control according to each application using the color sensor 140. For example, the controller 160 may control a history function recording reaction with respect to a color recognized by a user through a combination of a color change function, of screen data using a color recognized by the color sensor 140, a peripheral color searching function corresponding to a color provided to the display unit 150, a color dictionary function providing information regarding a color recognized by the color sensor, a color recognition function and other additional functions (e.g., photographing function, text input function, and voice recording function, etc.) of the color sensor. This will be described in an operation control method of a portable terminal to be explained later.

The portable terminal shown in FIG. 1 is applicable to all types of a portable terminal such as bar type, folder type, slide type, swing type, flip type, and the like. The portable terminal may include all information communication devices, multimedia devices, and application devices thereof. For example, the portable terminal may include small sized devices such as a mobile communication terminal, a Portable Multimedia Player (PMP), digital broadcasting player, a Personal Digital Assistant (PDA), a music player (e.g., MP3 player), a portable game terminal and a smart phone operating based on communication protocols corresponding to various communication systems. A function control method using a color sensor 140 according to an exemplary embodiment of the present invention is applicable to middle or large devices such as Television (TV), Large Format Display (LFD), Digital Signage (DS), media pole, Personal Computer (PC), and notebook.

Figure 2:
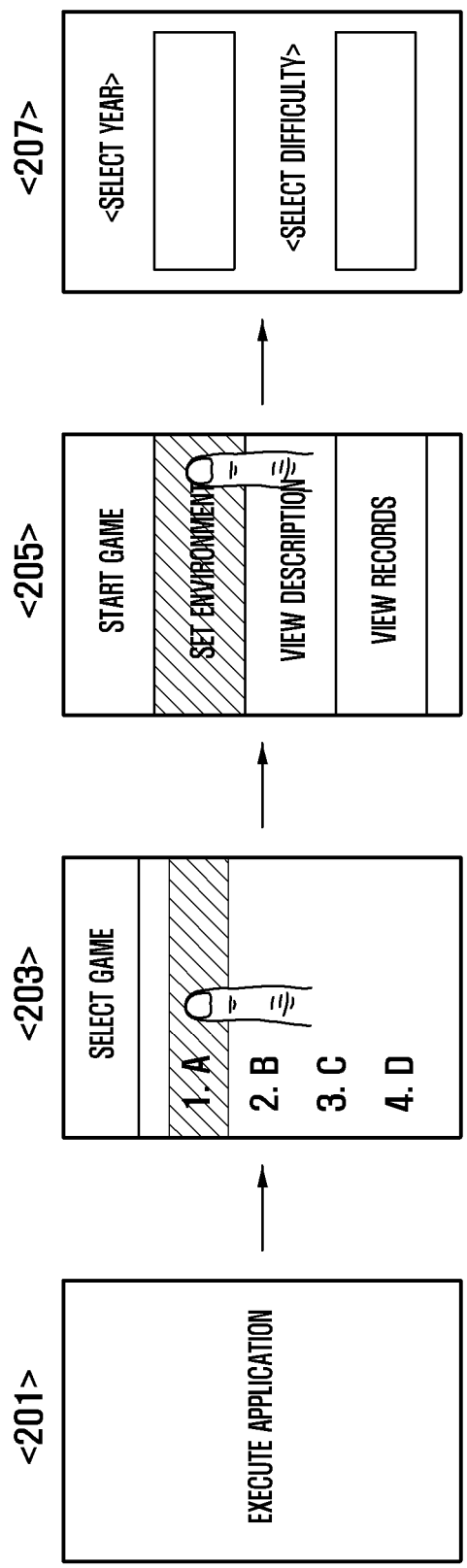
FIG. 2 is a view illustrating an example of a menu for executing an application using a color sensor in a portable terminal according to an exemplary embodiment of the present invention.

FIG. 2 is a view illustrating an example of a menu for executing an application using a color sensor in a portable terminal according to an exemplary embodiment of the present invention.

Referring to FIG. 2, as illustrated at block 201, a specific application is executed according to user request. The specific application indicates an upper application capable of selecting and setting an application using the color sensor 140.

As shown at block 201, when the specific application is executed, a list of at least one application using the color sensor 140 is displayed as illustrated at block 203. For example, a list including application A, application B, application C, and application D may be displayed. Applications A to D are distinguished from each other for convenience of description. The following is an explanation of operation control according to execution of applications such as the applications A to D using the color sensor 140 with reference to the accompanying drawings.

At block 203, one of the applications A to D may be selected. For example, as shown at block 203, an interaction selecting application A may be input. Such an interaction input displays sub-menus for the application A as illustrated at block 205.

At block 205, one item of start game, set environment, view description, or view records may be selected. For example, as illustrated at block 205, an interaction selecting a set environment item may be input. Such interaction input may set additional environments (e.g., selection of year or difficulty) for the application A as illustrated at block 207.

Although a detailed illustration and explanation are omitted in FIG. 2, an interaction selecting a game start item may be input at block 205. Such interaction input may execute the application A. At block 207, an interaction selecting a view description item may be input. Such interaction input allows a user to request help with respect to the application A. At block 205, an interaction selecting a view records item may be input. A user may confirm a history of information recorded according to prior execution of the application A.

Figure 3:
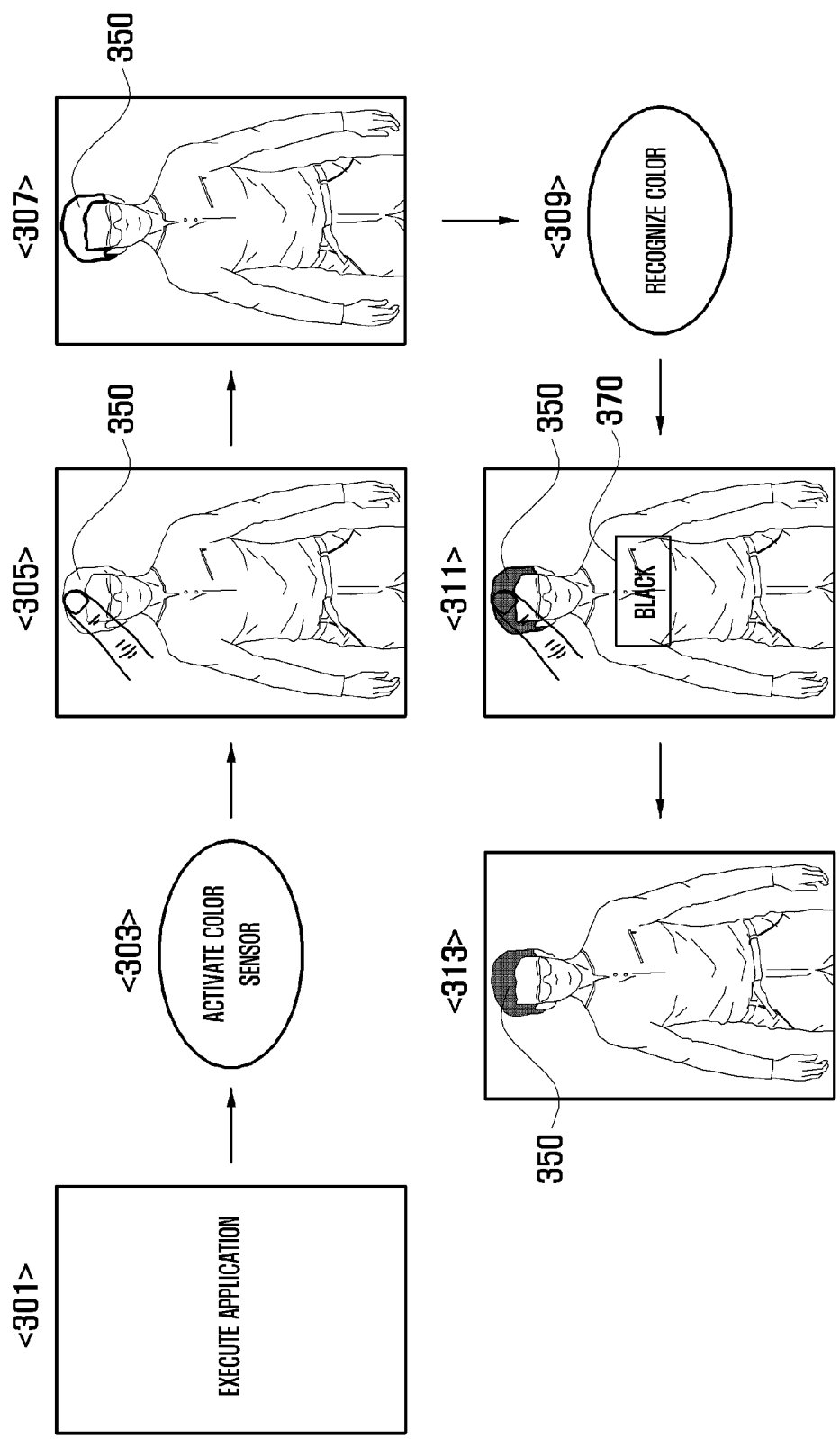
FIGS. 3-7 are views illustrating an example of an operation according to execution of an application using a color sensor in a portable terminal according to an exemplary embodiment of the present invention.

FIG. 3 is a view illustrating an example of an operation according to execution of an application using a color sensor in a portable terminal according to an exemplary embodiment of the present invention.

Referring to FIG. 3, as illustrated at block 301, a specific application is executed according to a user request. For example, the user may input an interaction selecting the application A at block 203 in FIG. 2. The interaction may be achieved by one of a physical key input of an input unit 110 or a touch input of a display unit 150. The application A may indicate an application of a function changing a color of screen data previously provided using a color recognized by a color sensor 140.

At block 301, when the application A is executed, a color sensor 140 is internally activated at block 303. As illustrated at block 305, screen data are displayed corresponding to execution of the application A. The screen data as illustrated at block 305 is displayed as an automatically and randomly selected screen data or screen data selected according to a selection procedure of a user. The screen data are provided in a Graphical User Interface (GUI) form in which a contour is presented a basic set color (e.g., white color). The GUI is provided in an image form, and respective components of the image may be distinguished. For example, as illustrated at block 305, a head, an upper body, and a lower body may be distinguished, and a specific object may be activated according to a user interaction. In addition, the user may select and activate one of the head, the upper body, or the lower body to input a color in a corresponding object. This will be described later.

At block 305, selection of a specific object of objects constructing screen data in which a color is input and input of a color recognized for the selected objection are possible. For example, as shown block 305, a user interaction selecting objects (e.g., head of a man) shown at block 305 may be input. An object 350 selected as shown at block 307 according to interaction input is activated and displayed. At blocks 305 and 307, when an object 350 selected according to a user interaction is activated, color recognition is internally performed as shown at block 309. For example, when an object 350 is selected according to a user interaction, the color sensor 140 measures and transfers light amount and a color of a periphery to the controller 160, and the controller 160 converts the color provided from the color sensor 140 as mentioned above.

At block 311, a color recognized in block 309 is input and displayed in the object 350 activated according to an interaction. In this case, the color is input to the object 350 such that the color recognized by the color sensor 140 is continuously updated and input according to change location of the portable terminal.

At block 311, when a recognized color is input to an activated object 350, corresponding color information may be provided. For example, at block 370, color information such as <black> for the recognized color may be provided with a pop-up.

A color most similar to the recognized color is searched from a basic color table supported from a portable terminal. The recognized color is compensated according to the searched color to obtain the color information. Such color compensation may be omitted according to construction degree of a database (DB) of colors supported from a basic color table and a user may provide color information for a real color recognized based on the color sensor 140.

At block 311, when input of a color to an object 350 activated according to a user interaction is terminated, a screen such as the screen shown at block 311 may be displayed. For example, at block 311, an interaction commanding application of an input color may be input. The interaction may be input through a physical key of an input unit 110 or a touch area for applying the input color to the display unit 150. When an interaction for applying an input color is input, as illustrated at block 311, the input color is applied to the object 350 to be displayed. As shown at block 313, the activated object 350 is inactivated and provided.

Figure 4:
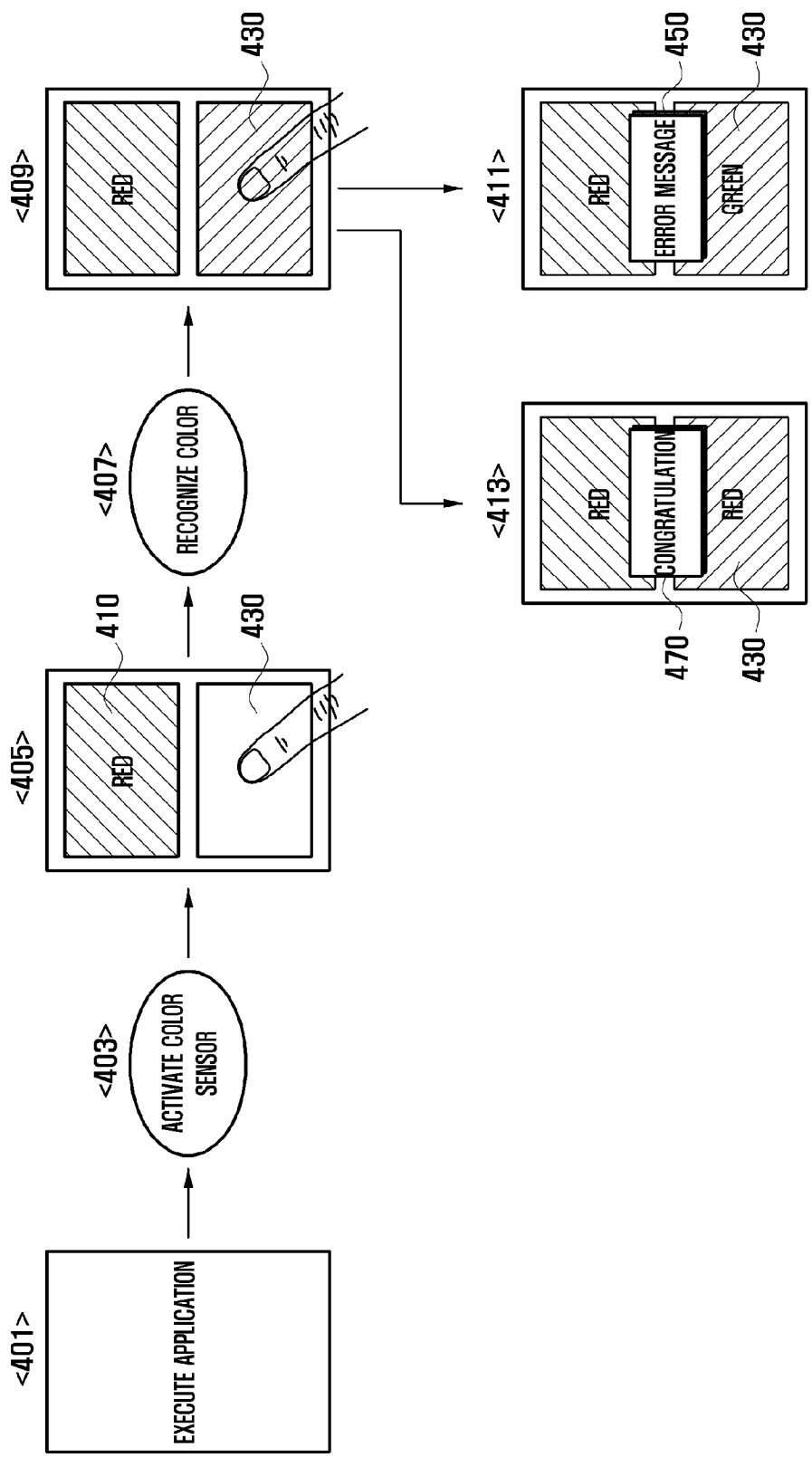

FIG. 4 is a view illustrating an example of an operation according to execution of another application using a color sensor in a portable terminal according to an exemplary embodiment of the present invention.

Referring to FIG. 4, a specific application is executed according to a user request as illustrated at block 401. For example, as mentioned above, a user may input an interaction selecting an application B. The application B may indicate an application of a function providing a specific color to screen data and informing whether the specific color is identical with a color provided from a user when a color corresponding to the color provided from a user is searched and input.

At block 401, when an application B is executed, the color sensor 140 is internally activated at block 203. At block 405, screen data corresponding to execution of the application B is displayed. Screen data as illustrated at block 405 may include an automatically selected random comparison color among basic set colors after execution of the application B or a comparison color selected according to a selection procedure of a user. The screen data may be divided into an upper comparison color display area 410 on which a comparison color is displayed and a lower recognition color display area 430 on which a recognition color searched and recognized by a user is displayed. The comparison color display area 410 and the recognition color display area 430 are arranged at upper and lower parts for convenience. The comparison color display area 410 and the recognition color display area 430 may also be arranged at left and right parts. Similarly, the comparison color display area 410 and the recognition color display area 430 may have different sizes.

At block 405, color-searching corresponding to a color provided to the comparison color display area 410 and a color recognized due to the color searching may be input to the recognition color display area 430. For example, as illustrated at block 405, an interaction selecting a recognition color display area 430 among areas constructing screen data may be input. When the interaction is input, color recognition is internally performed as illustrated at block 407. For example, upon input of the interaction, the color sensor 140 measures and transfers light amount and a color of a periphery to the controller 160, and the controller 160 converts a color transferred to the color sensor 140. As illustrated at block 409, a color recognized at block 407 is input and displayed on the recognition color display area 430. In this case, the color input to the recognition color display area 430 may be displayed such that the color recognized by the color sensor 140 is continuously updated and input according to change location of the portable terminal.

As illustrated at block 409, when the recognized color is displayed on the recognition color display area 430, an interaction instructing comparison of a recognition color and a comparison color may be input. The interaction may be achieved by touch input on one of the comparison color display area 410 or the recognition color display area 430 or a physical key input of the input unit 110. The interaction input may provide color information regarding a recognized color and result information according to a comparison result as illustrated at block 411 or 413.

For example, when the comparison color is not identical with the recognition color, a recognition color and color information (e.g., green) about the recognition color are provided to the recognition color display area 430 as illustrated at block 411, and a guide message 450 (e.g., error message) indicating that the comparison color is not identical with the recognition color may be provided in a pop-up form. When the comparison color is identical with the recognition color, as illustrated at block 413, the recognition color and color information (e.g., red) regarding the recognition color are provided to the recognition color display area 430, and a guide message 470 (e.g., congratulation message) indicating that the comparison color is identical with the recognition color may be provided in a pop-up form.

Detailed illustration and explanation are omitted in FIG. 4. However, an interaction for recognizing a new color may be input at block 411. Due to the interaction input, the color (e.g., green) input to the recognition color display area 430 is initialized (e.g., basic color input), and operations proceed to block 407 to search and recognize other colors.

An interaction for advance to a next stage may be input at block 413. Through the interaction input, a color (e.g., red) provided to the comparison color display area 410 is changed to another color (e.g., yellow), a color (e.g., red) input to the recognition color display area 430 is initialized (e.g., basic color input) and disappeared. The controller 160 proceeds to block 405 to perform operations as mentioned above.

Figure 5:
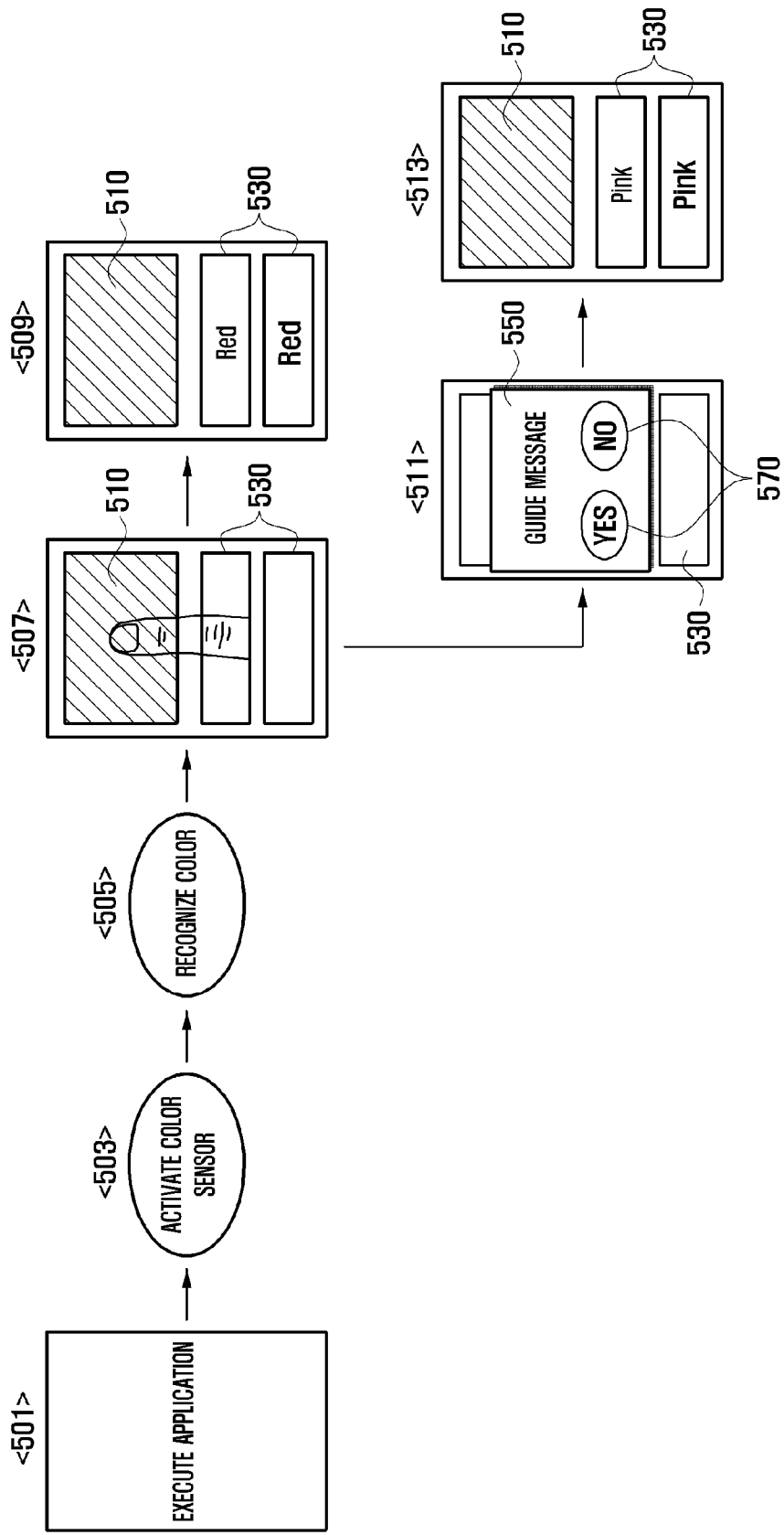

FIG. 5 is a view illustrating an example of an operation according to execution of another application using a color sensor in a portable terminal according to an exemplary embodiment of the present invention.

Referring to FIG. 5, a specific application is executed according to a user request as illustrated at block 501. For example, as described earlier, a user may input an interaction selecting an application C at block 203. The application C refers to an application having a function that provides color information regarding a color recognized by the color sensor 140.

At block 501, when an application C is executed, a color sensor 140 is activated as illustrated at block 503, and color recognition by a color sensor 140 is achieved. As illustrated at block 507, screen data including a color recognized at block 505 are displayed. The recognized color is input and displayed on a recognition color display area 510. The color is input to the recognition color display area 510 such that the color recognized by the color sensor 140 is continuously updated and displayed according to a location of the portable terminal. As illustrated at block 507, the screen data may be configured to have a recognition color display area 510 and a color information display area 530 to which color information with respect to the recognition color is provided. In this case, when the color information is configured by screen data displayed on the recognition color display area 510, the color information display area 530 may be omitted.

As illustrated at block 507, when the recognized color is displayed on the recognition color display area 510, an interaction requesting color information regarding a recognition color may be input. The interaction may be achieved by touch input on one of the recognition color display area 510 or the color information display area 530 or physical key input of an input unit 110. Color information corresponding to a recognition color is searched from a basic color table stored in a storage unit 130 by the interaction input. As illustrated at blocks 509 or 511, screen data according to a searching result of color information are provided.

For example, when there is color information regarding the recognized color, as illustrated at block 509, the color information (e.g., red) regarding the recognition color is provided to the color information display area 530. The color information may be provided with various languages such as native language (e.g., red) and English language (e.g., red). When there is no color information regarding the recognized color, as illustrated at block 511, and a pop-up window 550 checking absence of the color information regarding the recognized color and presence of registration of the recognized color is displayed. The pop-up window 550 may include a guide message checking absence of the color information and presence of registration of the recognized color, and a selection item 570 determining presence of the registration.

If an interaction is input to a selection item (e.g., No) canceling the registration, the operation proceeds to block 505 and the foregoing operations may be performed. Conversely, when an interaction is input to a selection item (e.g., YES) requesting registration, as illustrated at block 513, a color information display area is displayed to receive input from a user. As illustrated at block 513, a user may directly input and store color information (e.g., pink) regarding a color displayed on the recognition color display area 510 on the color information display area 530.

A color most similar to a color recognized through a color sensor 140 is searched from a basic color table supported from the portable terminal. The color information may be provided based on the searched color.

Figure 6:
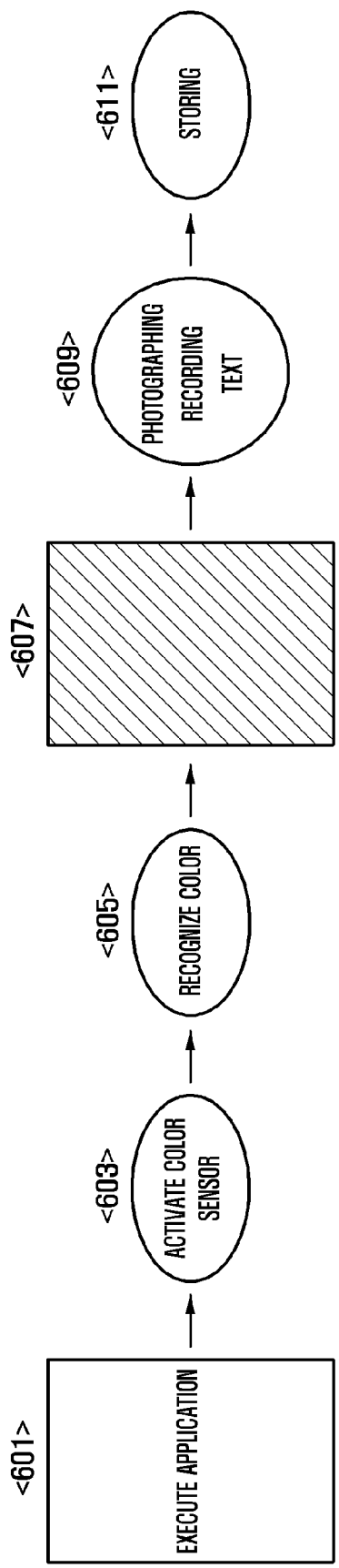

FIG. 6 is a view illustrating an example of an operation according to execution of another application using a color sensor in a portable terminal according to an exemplary embodiment of the present invention.

Referring to FIG. 6, as illustrated at block 601, a specific application is executed according to user request. For example, as described previously, a user may input an interaction selecting an application D. The application D may indicate an application providing a history by using color recognition by the color sensor 140, photographing by a camera module (not shown), recording by a microphone MIC, and text input by the input unit 110 or the display unit 140 to record a state reacting for the specific color by the user.

As illustrated at block 601, when the application D is executed, the color sensor 140 is activated after color recognition at block 603, and color recognition by the color sensor 140 is performed as illustrated at block 605. At block 607, screen data including a color recognized at block 605 is displayed.

As illustrated at block 603, upon activation of the color sensor 140 or after color recognition at block 607, at least one additional function according to user setting due to an input user interaction may be activated. The additional function may be activated when a user interaction is input at block 607. For example, when the user interaction is input at block 607, a camera module (not shown) is activated to activate a photographing function. The microphone MIC may be activated to activate a voice recording function. A text input function may be activated. Upon activation of the camera module, preview data transferred by the camera module may be provided to one area at block 607 or internally processed with a background display. In addition, the camera module may be provided on the same plane of a display unit 150 on which the screen data are displayed to be used.

As illustrated at block 609, input data may be recorded according to an additional function activated while displaying the color recognized through the color sensor 140. For example, as described earlier, when activating a photographing function by the camera module, images (e.g., static images by photographing or moving images by photographing moving images) provided from the camera module may be recorded. Upon activation of a voice recording function by a microphone MIC, voices provided from the MIC may be recorded. Upon activation of a text input function, an input signal generated by a user input may be recorded. As illustrated at block 611, a color recognized through the color sensor 140 and at least one data (e.g., photograph data, moving image data, voice record data, etc.) may be combined and stored.

For example, a photographing function and a recording function may be activated at the time of color recognition of a user. The user provides a screen on which the recognized color is recognized to another user. In this case, the camera module provided at the same plane of the display unit 150 may photograph images of another user (e.g., photographing pictures or moving images) and record voices of another user by the MIC. A recording function of a camcorder may be executed.

As explained above, the color recognized according to a user interaction, the photographed image, and a recorded voice may be converted into data and stored. A description of a method using the stored data with reference to the drawing is provided below. Through a function as illustrated in FIG. 6, a user may record a reaction (e.g., face shape, voice, etc.) when another user touches a specific color. For example, parents may record various data for color reaction of a child.

Figure 7:
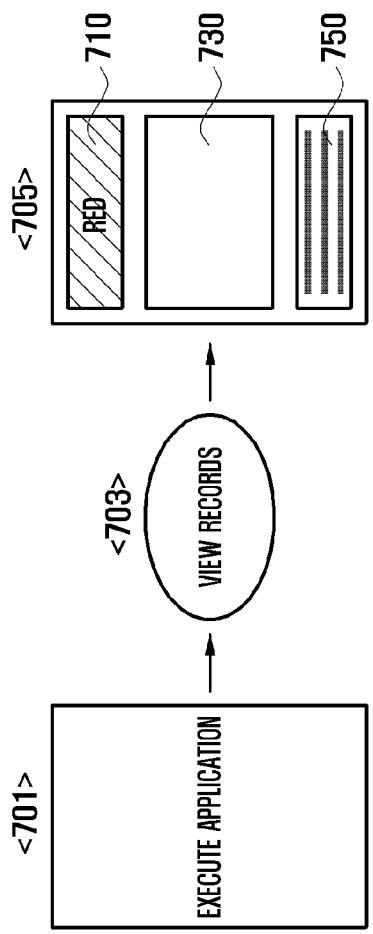

FIG. 7 is a view illustrating an example of an operation providing stored data in a portable terminal according to an exemplary embodiment of the present invention.

Referring to FIG. 7, as illustrated at block 701, a specific application is executed according to a user request. The specific application may refer to an application for checking stored data as described above with respect to FIG. 6. The specific application may be the same application as that of the application D executed at block 601 of FIG. 6.

As illustrated at block 701, after execution of the specific application, a record view menu may be selected as illustrated at block 703. For example, an interaction selecting the record view menu may be input from a menu list provided according to execution of the specific application. As illustrated at block 705, screen data stored by an operation of FIG. 6 are displayed by the interaction input.

As illustrated at block 705, the screen data may be configured to have a recognition color display area 710 displaying a color recognized by the color sensor 140, an image display area 730 displaying an image photographed image by a photographing function, and a text display area 750 displaying texts input by a text input function.

The recognition color display area 710 is an area on which a color recognized and stored in an operation of FIG. 6 as mentioned above is displayed. The image display area 730 is an area on which an image (e.g., static image or moving image) photographed and stored in the operation of FIG. 6 as mentioned above is displayed. The text display area 750 is an area on which a text input and stored in the operation of FIG. 6 as described above is displayed. In the operation of FIG. 6, when voices are recorded and stored, voices recorded through the speaker SPK may be output at block 705. Image output on the image display area 730, text output on the text display area 750, and voice output by the speaker SPK may be provided by combining data recorded according to a user setting in the operation of FIG. 6 with a recognition color.

Detailed illustration and description are omitted in FIG. 7. However, when an interaction selecting a record view menu is input at block 703, a sub-menu for the record view menu may be displayed. For example, a list for various data stored by the operation of FIG. 6 as mentioned above may be displayed. The user may input an interaction selecting optional data items from the list. The user may confirm screen data as illustrated at block 704 by the interaction.

FIG. 8 is a flowchart illustrating a control method of a portable terminal when an application is executed using a color sensor in the portable terminal according to an embodiment of the present invention.

Referring to FIG. 8, a controller 160 may control execution of an application according to a user selection as mentioned above in step 801. For example, the controller 160 may receive the input signal when a user inputs an interaction selecting one of applications A to D at block 203 of FIG. 2. The controller 160 may execute an application according to the interaction.

The controller 160 controls activation of a color sensor 140 upon execution of the application selected according to the interaction in step 803. When the application is executed, the controller 160 determines a type of the executed application in step 805 to determine presence of execution of color recognition based on the type of the executed application in step 807. For example, the controller 160 determines whether the executed application is a type executing color recognition after a user interaction such as an operation according to execution of the application A of FIG. 3, an operation according to execution of the application B, a type executing the color recognition at the time of activating the color sensor 140 like an operation execution of the application C of FIG. 5, or an operation according to execution of the application D of FIG. 6. The controller 160 determines presence of execution of the color recognition according to the determined type of the executed application.

Subsequently, when the color recognition is executed (YES of step 807), the controller 160 controls color recognition through the color sensor 140 in step 809. The controller 160 configures screen data corresponding to the executed application based on the recognized color to control indication thereof in step 811. For example, after the color recognition, the controller 160 may configure and provide screen data such as shown at block 507 of FIG. 5 or screen data such as shown at block 607. The controller 160 control display of the color recognized by the color sensor on a corresponding display area at the time of providing the screen data.

After displaying the screen data including the recognition color, the controller 160 may control execution of a corresponding operation according to the executed application in step 813. For example, the controller 160 may search and provide color information for a recognized color according to a user interaction as illustrated in an example of an operation in FIG. 5 or control execution of an operation combining images, voices, and texts with the color recognized according to the user interaction and an execution additional function to record it.

When the color recognition is not executed (NO of step 807), the controller 160 configures screen data corresponding to the executed application to control indication thereof in step 815. For example, after activating the color sensor 140, the controller 160 may configure and provide screen data such as illustrated at 305 or screen data such as illustrated at block 450 of FIG. 4 as described earlier according to the executed application.

Subsequently, after controlling the indication of the screen data, the controller 160 receives a user interaction in step 817. For example, when the user inputs an interaction selecting a specific area configuring screen data as in an example of an operation of FIG. 3 or in an example of an operation of FIG. 4, the controller 160 receives an input signal thereof. When the interaction is input, the controller 160 controls color recognition through the color sensor 140 as described previously in step 819.

The controller 160 controls display of the recognized color on the screen data in step 821. For example, the controller 160 may configure screen data including a color recognized such as illustrated at block 311 of FIG. 3 or block 409 of FIG. 4 to control indication thereof.

After displaying screen data including the recognition color, the controller 160 may control execution of a corresponding operation according to the executed application in step 823. For example, the controller 160 may apply a color recognized according to a user interaction to the screen data as illustrated in an example of an operation of FIG. 3, or determine whether the color recognized according to the user interaction is identical with a basic color to control execution of an operation outputting a checked result.

As described above, in a method and an apparatus for providing a function of a portable terminal using a color sensor according to an exemplary embodiment of the present invention, an apparatus capable of supporting a learning function with respect to a color using a color sensor in a portable terminal and a control method thereof are provided. An exemplary embodiment of the present invention may extend to various functions by a combination of restrictive functions supported from the portable terminal and a color sensor. An exemplary embodiment of the present invention may provide information regarding a color recognized by the color sensor to provide an optimal environment with respect to color learning. An exemplary embodiment of the present invention may provide various new functions using a color sensor, such as a coloring function coloring on screen date using a color recognized by a color sensor, a color searching function recognizing and matching a color corresponding to a provided color by the color sensor, a color dictionary function providing color information regarding the color recognized by the color sensor, and a color diary function providing a history according to the color recognized by the color sensor and a color according to convergence of other additional functions. An exemplary embodiment of the present invention may improve a learning effect using a portable terminal by implementing a new function using a color sensor and accordingly improve difference and competitive force of the portable terminal.

A method for providing a function of a portable terminal using a color sensor according to an exemplary embodiment of the present invention may be implemented in a program command form capable of be performed through various computer means to be recorded in a computer-readable recording medium. In this case, the computer-readable recording medium may include a program command, a data file, and a data structure separately or in a combination thereof. The program command recorded in a recording medium may be a command designed or configured specially for the present invention, or usably known to a person having ordinary skill in the art.

The computer-readable recording medium includes a hardware device specially configured to store and execute a program command such as magnetic media including a hard disc, a floppy disc, and a magnetic tape; optical media including CD-ROM or DVD; magneto-optical media such as floptical disk; ROM; RAM; flash memory; and other non-transitory media. The program command may include a high level language code executable by a computer using an inter-print as well as a machine language code such as a code created by a compiler. The hardware device can be configured with at least one software module to execute operations of the present invention.

While the invention has been shown and described with reference to certain exemplary embodiments thereof, it will be understood by those skilled in the art that various changes in form and details may be made therein without departing from the spirit and scope of the invention, as defined by the appended claims and their equivalents.

What is claimed is:

1. A method for providing a function of a portable terminal, comprising:
    activating a color sensor upon execution of an application;
    displaying a color recognized by the color sensor on screen data corresponding to the executed application; and
    controlling a function based on the color recognized by the executed application,
    wherein the color sensor measures a light amount and a color of a periphery to distinguish Red, Green and Blue using a difference in wavelengths, and
    wherein the controlling of the function comprises:
        comparing a comparison color provided on the screen data with the recognized color when a user interaction is input after inputting and displaying the recognized color;
        outputting the recognized color, color information of the recognized color, and a congratulation message when the comparison color is identical with the recognized color; and
        outputting the recognized color, color information of the recognized color, and an error message when the comparison color differs from the recognized color.

2. The method of claim 1, wherein the displaying of the color comprises:
    checking a type of the executed application;
    determining presence of execution of color recognition according to the type of the executed application;
    configuring and displaying first screen data including a color recognized by the color sensor when it is determined to execute the color recognition prior to input of an interaction; and
    configuring and displaying second screen data corresponding to the executed application when it is determined to execute the color recognition after the input of the interaction.

3. The method of claim 2, wherein the determining of the presence of the execution of color recognition comprises determining whether the executed application is a type in which color recognition is executed after a user interaction or a type in which the color recognition is executed at the time of activating the color sensor prior to the user interaction.

4. The method of claim 2, wherein the configuring and displaying of the first screen data comprises:
    recognizing a color through the color sensor; and
    inputting and displaying the recognized color on the first screen data corresponding to the executed application.

5. The method of claim 4, wherein the controlling of the function comprises:
    inputting and displaying the recognized color on the first screen data; and
    providing color information regarding the recognized color when a user interaction is input.

6. The method of claim 4, wherein the controlling of the function comprises:
    inputting and displaying the recognized color on the first screen data;
    activating at least one additional function set when a user interaction is input; and
    combining and storing data created by the additional function with the recognized color.

7. The method of claim 2, wherein the configuring and displaying of the second screen data comprises:
    displaying screen data corresponding to the executed application;
    receiving input of a user interaction;
    recognizing a color through the color sensor when the user interaction is input; and
    inputting and displaying the recognized color on the second screen data.

8. The method of claim 7, wherein the controlling of the function comprises:
    displaying color information regarding the recognized color; and
    applying the input color to the second screen data when a user interaction is input after inputting and displaying the recognized color.

9. A portable terminal comprising:
    a display unit configured to display screen data corresponding to an executed application;
    a color sensor configured to detect a color; and
    a controller configured to display a color recognized by the color sensor on the screen data corresponding to an executed application when an application is executed, and to control execution of a function based on the color recognized in the executed application,
    wherein the color sensor measures a light amount and a color of a periphery to distinguish Red, Green and Blue using a difference in wavelengths, and
    wherein the controller is further configured to:
        compare a comparison color provided on the screen data with the recognized color when a user interaction is input after inputting and displaying the recognized color;
        output the recognized color, color information of the recognized color, and a congratulation message when the comparison color is identical with the recognized color; and
        output the recognized color, color information of the recognized color, and an error message when the comparison color differs from the recognized color.

10. The portable terminal of claim 9, wherein the screen data includes an area on which a color recognized through the color sensor is displayed.

11. The portable terminal of claim 10, wherein the controller determines whether to execute color recognition according to the type of the executed application upon execution of the application.

12. The portable terminal of claim 11, wherein the controller determines whether the executed application is a type in which color recognition is executed after a user interaction or a type in which the color recognition is executed at the time of activating the color sensor prior to a user interaction.

13. The portable terminal of claim 12, wherein the controller configures and displays screen data including a color recognized by the color sensor when it is determined to execute the color recognition prior to input of an interaction.

14. The portable terminal of claim 12, wherein the controller inputs and displays a color recognized by the color sensor according to a user interaction input after displaying screen data corresponding to the application when it is determined to execute color recognition after input of an interaction on the display unit.

15. A method of providing a color recognition function in a portable terminal, the method comprising:
- executing an application stored in the portable terminal;
- activating a color sensor of the portable terminal;
- displaying, on the portable terminal, screen data based on at least one of a color recognized by the color sensor, a function of the executing application, and a user interaction; and
- controlling an operation of the executing application based on the recognized color,
- wherein the color sensor measures a light amount and a color of a periphery to distinguish Red, Green and Blue using a difference in wavelengths, and
- wherein the controlling of the function comprises:
  - comparing a comparison color provided on the screen data with the recognized color when a user interaction is input after inputting and displaying the recognized color;
  - outputting the recognized color, color information of the recognized color, and a congratulation message when the comparison color is identical with the recognized color; and
  - outputting the recognized color, color information of the recognized color, and an error message when the comparison color differs from the recognized color.

16. The method of claim 15, wherein the activation of the color sensor occurs prior to the displaying of the screen data, and
- wherein the displaying of the screen data comprises displaying the screen data based on the color recognized by the color sensor.

17. The method of claim 15, wherein the activation of the color sensor occurs after receiving a user interaction, and
- wherein the displaying of the screen data comprises displaying the screen data based on the user interaction and the function of the executing application.

* * * * *